Patented Feb. 16, 1943

2,311,598

UNITED STATES PATENT OFFICE 2,311,598

PROCESS OF MAKING BUTTER

Charles Schwartz, Pittsburgh, Pa., assignor to Hall Laboratories, Inc., Pittsburgh, Pa., a corporation of Pennsylvania No Drawing. Application September 8, 1939, Serial No. 293,956

3 Claims. (Cl. 99—119)

This invention relates to a process of making butter and more particularly to a process in which the churning time ordinarily required to convert cream into butter is materially reduced.

I have found that the churning time may be cut down considerably by adding to the cream a small amount of certain molecularly dehydrated phosphates. The molecularly dehydrated phosphate which I prefer to use is the molecularly dehydrated sodium phosphate which is a polymer of sodium metaphosphate ($NaPO_3$). This preferred molecularly dehydrated phosphate is glassy and is substantially neutral in character. The preferred phosphate is commonly known as "Graham's metaphosphate" or "Graham's salt" and is believed to be the hexametaphosphate $(NaPO_3)_6$. Sodium metaphosphate has a molar ratio of $Na_2O$ to $P_2O_5$ of 1:1 and is substantially neutral in character. It contains about 31% $Na_2O$ and 69% $P_2O_5$. Although I prefer to use "Graham's metaphosphate," I may use those molecularly dehydrated phosphates which are alkaline in character or those which are very slightly acid. The alkalinity or acidity of the molecularly dehydrated phosphates may be controlled by varying the ratio of $Na_2O$ to $P_2O_5$ in the starting material. Thus by reacting different proportions of sodium carbonate and phosphoric acid and heating the mixture to a temperature sufficient to drive off water of constitution, molecularly dehydrated phosphates giving different pH values in solution may be obtained, which may be utilized in part to standardize the acidity of the cream which is to be used in making the butter.

I prefer to use about ½ ounce to one ounce of the molecularly dehydrated phosphate per ten gallons of cream but these amounts may be varied considerably and I may use from about ⅛ ounce to about two ounces of the phosphate per ten gallons of cream.

Instead of the substantially neutral glassy sodium metaphosphate having the molar ratio of $Na_2O$ to $P_2O_5$ of 1:1, I may use a glassy molecularly dehydrated phosphate having a molar ratio of $Na_2O$ to $P_2O_5$ as low as about 0.9:1 or as high as about 1.7:1. The molecularly dehydrated phosphate having the ratio of 0.9:1 contains about 28% $Na_2O$ and about 72% $P_2O_5$. The molecularly dehydrated phosphate having the ratio of 1.7:1 contains about 43% of $Na_2O$ and 57% of $P_2O_5$. The crystalline molecularly dehydrated phosphate of this composition is sodium tripolyphosphate of the formula $Na_5P_3O_{10}$.

I have found that the effectiveness of the molecularly dehydrated phosphates in decreasing the churning time required to convert cream into butter depends upon the physical character of the phosphate. The glassy molecularly dehydrated phosphates are effective but the crystalline molecularly dehydrated phosphates are not effective, with the single exception of alkali tripolyphosphates. Sodium tripolyphosphate cuts down the churning time, even though it is a crystalline material, but the other crystalline materials such as sodium pyrophosphate ($Na_4P_2O_7$) and crystalline sodium metaphosphate known as sodium trimetaphosphate are not effective in the present invention. The present invention, therefore, includes only the glassy molecularly dehydrated phosphates and the crystalline tripolyphosphates but no other crystalline molecularly dehydrated phosphate. The invention does include, however, mixtures of other materials with either or both of glassy molecularly dehydrated phosphate and crystalline tripolyphosphate, because such mixtures contain the effective molecularly dehydrated phosphates. Thus, mixtures containing crystalline molecularly dehydrated phosphates may be made by annealing the glassy molecularly dehydrated phosphates and the mixture of crystalline phosphates is effective if tripolyphosphate is present. If any glassy phosphate is annealed at a temperature of 300° C. or higher but below its melting point, for a sufficient time, say at a temperature of 500° C. for one hour and then cooled, a crystalline material is obtained. If the glass is hexametaphosphate, the crystalline product is trimetaphosphate $(NaPO_3)_3$. If the glass contains a ratio of $Na_2O:P_2O_5$ corresponding to tripolyphosphate ($Na_5P_3O_{10}$), the crystalline product is tripolyphosphate. Glasses having $Na_2O:P_2O_5$ ratios between hexametaphosphate and tripolyphosphate when annealed give crystalline mixtures of trimetaphosphate and tripolyphosphate. For example, a glass containing approximately 40% $Na_2O$ and 60% $P_2O_5$ when annealed results in a crystalline product which is a mixture of crystalline tripolyphosphate and crystalline trimetaphosphate, the crystalline tripolyphosphate predominating and is effective, the trimetaphosphate being present in relatively small amount and is relatively ineffective.

The glassy phosphates may be readily distinguished from the crystalline phosphates by X-ray analysis. The spectrum for a glassy phosphate shows diffused bands, while that for a crystalline phosphate shows distinct lines. In the claims, the term "glassy" is, therefore, used to designate a material whose X-ray spectrum shows diffused bands.

Although I prefer to use the molecularly dehydrated sodium phosphate for reasons of economy, I may use the soluble molecularly dehydrated phosphates of potassium, lithium or ammonium.

The invention is not limited to the preferred materials or proportions, which have been given merely by way of example, but may be otherwise embodied or practiced within the scope of the following claims.

I claim:

1. The process of making butter, which comprises adding to cream in the absence of previously treated butter, a small amount of a molecularly dehydrated phosphate of the group consisting of glassy molecularly dehydrated alkali phosphates and alkali tripolyphosphates in which the molar ratio of alkali oxide to phosphorus pentoxide is between about 0.9:1 and 1.7:1, and churning until butter is produced.

2. The process of making butter, which comprises adding to cream in the absence of previously treated butter, a small amount of a molecularly dehydrated phosphate of the group consisting of glassy molecularly dehydrated sodium phosphates and sodium tripolyphosphate which contain between about 57% to 72% of $P_2O_5$, and churning until butter is produced.

3. The process of making butter, which comprises adding to cream in the absence of previously treated butter, about 1/8 ounce to two ounces per ten gallons of cream, of a molecularly dehydrated phosphate of the group consisting of glassy molecularly dehydrated alkali phosphates and alkali tripolyphosphates in which the molar ratio of alkali oxide to phosphorus pentoxide is between about 0.9:1 and 1.7:1 and churning until butter is produced.

CHARLES SCHWARTZ.